May 18, 1954 R. S. EDMUNDS, JR 2,678,493
BUTTER AND OLEOMARGARINE CUTTING MACHINE
Filed July 31, 1950 4 Sheets-Sheet 2
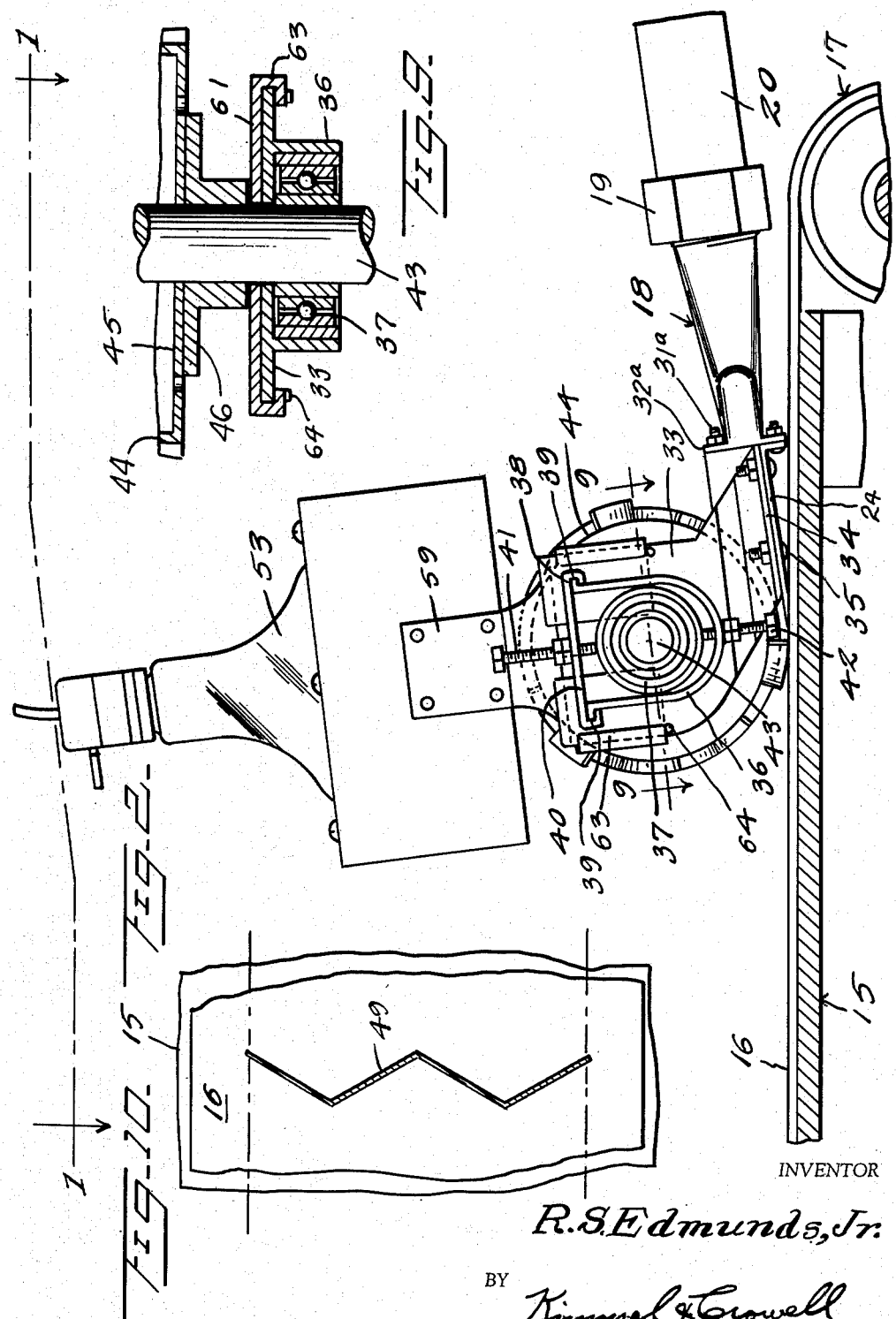
INVENTOR
R. S. Edmunds, Jr.
BY
Kimmel & Crowell
ATTORNEYS

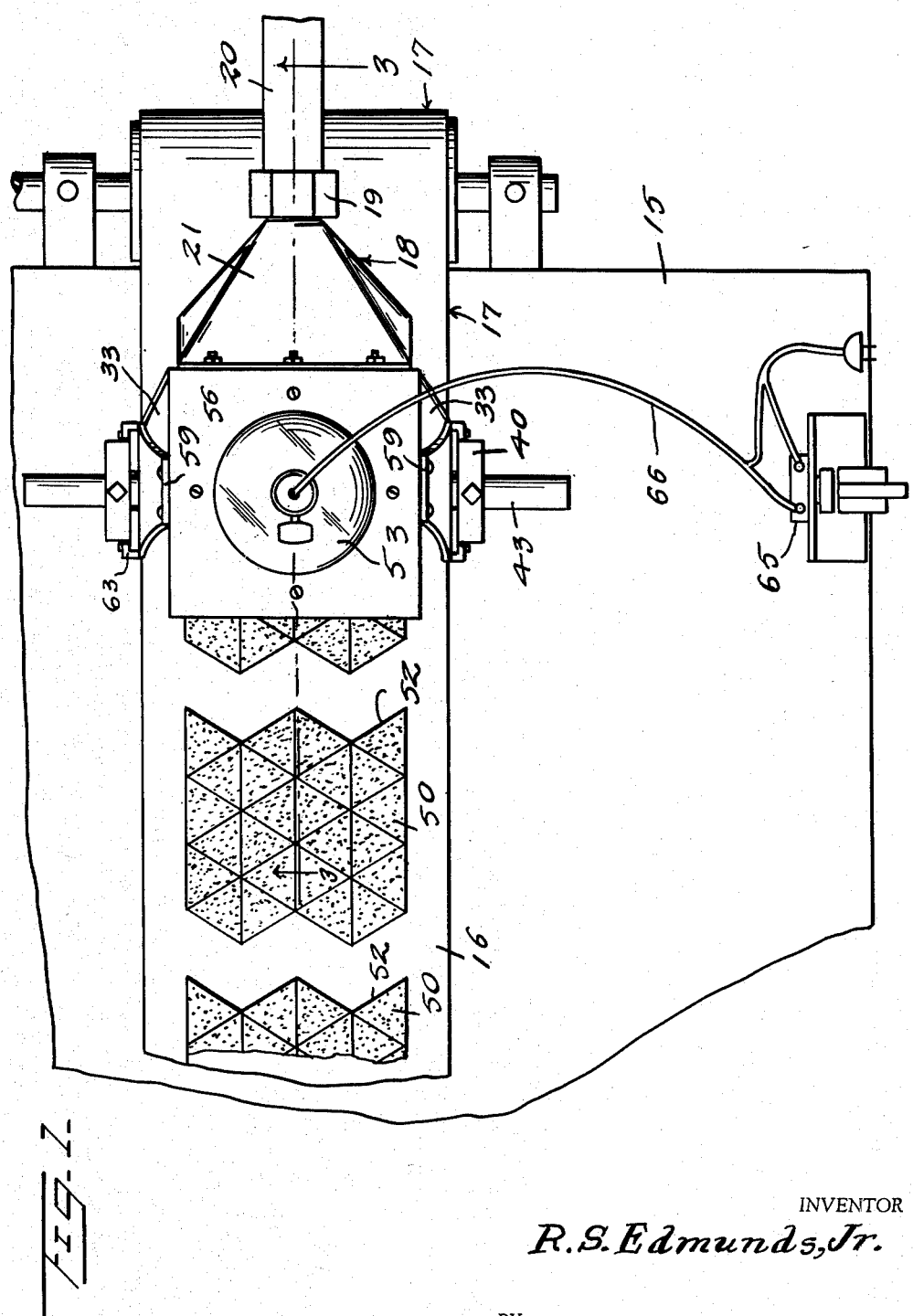

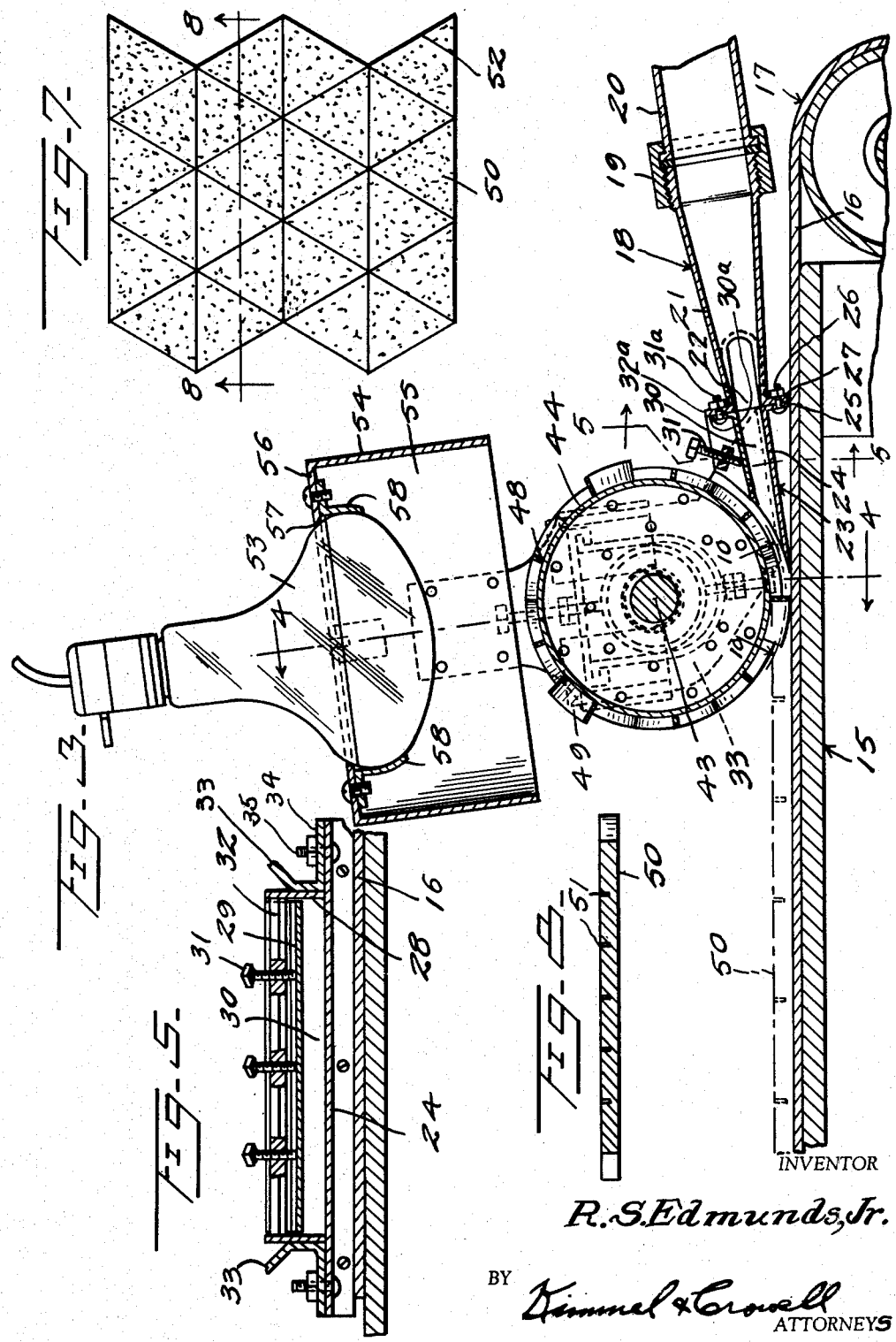

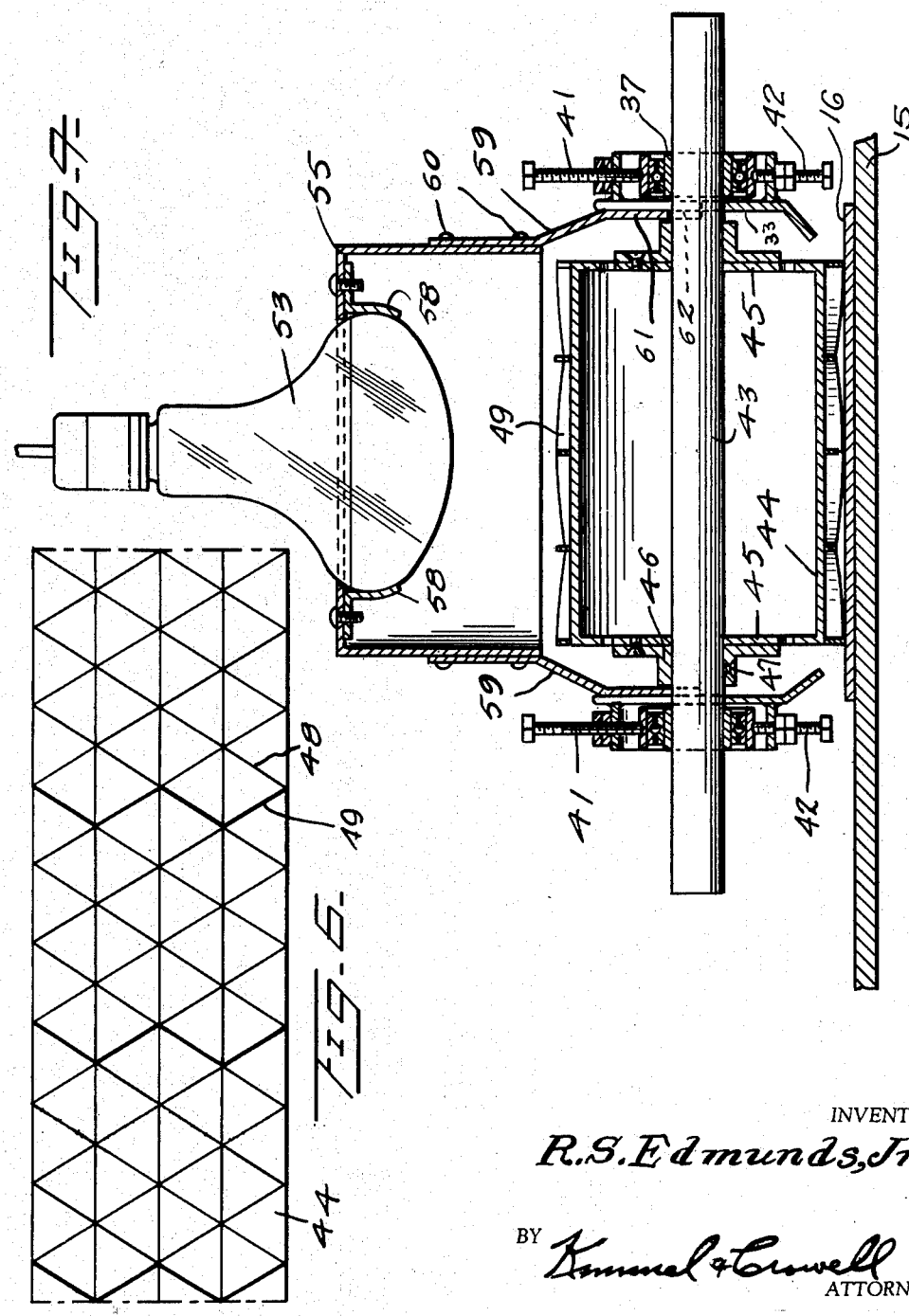

UNITED STATES PATENT OFFICE 2,678,493

BUTTER AND OLEOMARGARINE CUTTING MACHINE

Raymond S. Edmunds, Jr., San Antonio, Tex.

Application July 31, 1950, Serial No. 176,856

1 Claim. (Cl. 31—14)

This invention relates to a machine for cutting and scoring butter or oleomargarine.

In the formation of butter or oleomargarine chips the material is taken from the congealing machine or churn and is then passed through an intermediate chilling process to make the material more firm. After the material is chilled it is formed into flat sheets and scored and cut into the desired sizes. It is an object of this invention to provide a machine which will eliminate the intermediate chilling process and which will form the material into scored sheets of desired thickness.

Another object of this invention is to provide in combination with an extrusion nozzle, a rotatable scorer and cutter which will produce chips of uniform size and thickness in a continuous process.

A further object of this invention is to provide in combination with an extrusion nozzle, a rotatable scorer and cutter on the discharge end of the nozzle which is rotated by the force of the material extruded from the nozzle so that the material will be uniformly scored and cut irrespective of the rate of flow of the material through the nozzle.

A further object of this invention is to provide a device of this kind which will eliminate leftover or waste pieces.

A further object of this invention is to provide a machine of this kind which is simple in construction so that it can be easily and rapidly assembled or disassembled for cleaning.

With the above and other objects in view, my invention consists in the arrangement, combination and details of construction disclosed in the drawings and specification, and then more particularly pointed out in the appended claim.

In the drawings,

Figure 1 is a top plan view of a machine constructed according to an embodiment of this invention, Figure 2 is an enlarged detailed side elevation of the machine, Figure 3 is an enlarged fragmentary longitudinal section taken on the line 3—3 of Figure 1, Figure 4 is a sectional view taken on the line 4—4 of Figure 3, Figure 5 is a fragmentary sectional view taken on the line 5—5 of Figure 3, Figure 6 is an enlarged extended plan view showing the arrangement of the cutting and scoring blades, Figure 7 is an enlarged plan view of one of the cut and scored sections, Figure 8 is a sectional view taken on the line 8—8 of Figure 7, Figure 9 is an enlarged fragmentary sectional view taken on the line 9—9 of Figure 2, Figure 10 is an enlarged fragmentary sectional view taken on the line 10—10 of Figure 3.

Referring to the drawings, the numeral 15 designates generally a table having the upper run 16 of an endless conveyor generally designated as 17 movably engaging thereover. A material extruding nozzle generally designated as 18 is disposed over the upper run of the conveyor 17 and connected by means of a coupling 19 to a supply pipe 20. The supply pipe 20 is connected to a source of material under pressure with the material movable through the pipe 20 into the nozzle structure 18. The nozzle structure 18 is formed of two parts with one part 21 forming the rear part and as shown in Figure 1, of tapering and forwardly divergent configuration.

The forward end of the rear part 21 is flattened out to provide a flat horizontally disposed opening 22, Figure 3. The nozzle structure 18 also includes a forward nozzle part 23 which is formed of a bottom wall or plate 24 having a rear flange 25 adapted to be secured by fastening means 26 to a confronting flange 27 carried by the forward end of the rear nozzle member 21. The plate 24 has fixed thereto a pair of upstanding flanges 28 and an adjustable nozzle plate 29 engages between the flanges 28 and is formed at its rear end with an upstanding flange 30a secured by fastening means 31a to an upstanding flange 32a carried by the upper side of the rear nozzle member 21.

The upper wall or plate 29 is adapted to be adjusted relative to the bottom wall 24 so as to provide for the desired passage or opening 30 by means of a plurality of adjusting bolts 31. The adjusting bolts 31 are threaded through a transversely extending bar 32 which is fixed as by welding or the like between the upstanding flanges 28.

A pair of vertically disposed bearing supports 33 are disposed on each side of the forward nozzle 23 and include a horizontal flange 34 which is secured as by removable fastening means 35 to the bottom plate 24. The bearing support 33 is laterally offset from the forward nozzle member 23 and is formed with a U-shaped flange 36 within which an anti-friction bearing member 37 is adapted to be removably mounted. The U-shaped flange 36 is provided at its upper ends with laterally projecting lugs 38 which are engaged by reverted or hook-shaped clamping means 39 carried by a bar 40. The bar 40 engages over the upper open ends of the flange 36 and has a bearing adjusting bolt 41 threaded therethrough.

A lower bearing adjusting bolt 42 is threaded through the bight of the flange 36 and bears against the anti-friction bearing 37 at a point diametrically opposite from the bolt 41. A shaft 43 extends through the anti-friction bearing 37 and has fixed thereto a cylindrical cutter drum 44. The drum 44 includes end walls 45 which have secured thereto flanged bushings 46 which are adapted to be secured by fastening means 47 to the shaft 43. The cylindrical carrier or drum 44 has fixed thereto a plurality of triangularly related material scoring blades 48, and the drum or carrier 44 also has secured thereto at spaced intervals staggered cutting blades 49. The cutting blades 49 are substantially deeper than the scoring blades 48 and provide a means whereby a strip or sheet of plastic material similar to that shown in Figures 6, 7, and 8 and indicated by the numeral 50 may be scored and cut at spaced intervals.

The configuration of the scoring blades 48 will determine the shapes of the chips which are to be cut and scored. As herein disclosed the blades 48 are arranged as equilateral triangles for cutting triangular chips. As shown in Figure 8 the scoring blades 48 will form the triangularly related scores 51 which do not project entirely through the plastic sheet 50, whereas the blades 49 will form the staggered ends 52 as shown in Figure 7. The combined cutter and scorer formed of the drum 44 and the blades 48 and 49 is heated to the desired degree so as to prevent adherence of the material on the blades 48 and 49 and the periphery of the drum 44 by means of a heat lamp or bulb 53. The heat lamp or bulb 53 is of conventional construction and is mounted partly in a downwardly directed shield or housing formed of parallel side walls 54 and parallel end walls 55.

The shield or housing includes a top wall 56 having an opening 57 through which the bulb 53 partly projects, and the bulb is removably secured in the opening 57 by clamping means 58. The shield or housing formed of the walls 54, 55 and 56 is supported above the combined scorer and cutter by means of downwardly projecting brackets 59 secured by fastening means 60 to the end walls 55. The brackets 59 are formed with offset lower ends 61 having slots 62 whereby the lower ends may straddle shaft 43. The brackets 59 are removably secured to the bearing supporting members 33 by means of hook-shaped clamping members 63 carried by the opposite vertical edges of the lower ends 61. The clamping members 63 are adapted to slide over the opposite edges of the bearing supports 33 and are limited in their downward movement by stop members 64 carried by the bearing supports 33.

The degree of heat generated by the heat lamp 53 is regulated by means of a rheostat 65 which is disposed in offset relation with respect to the conveyor 17. The rheostat 65 is connected to the heat lamp 53 by means of conductors 66.

In the use and operation of this device the material such as butter, oleomargarine, or the like, is forced under pressure through the supply pipe 20 into the nozzle 18. The nozzle 18 will flatten the material, and the thickness of the extruded material is regulated by adjustment of the nozzle wall 29. As the material is forced through the forward nozzle member 23 this material will strike the blades 48 and 49 of the combined cutter and scorer and will force the combined cutter and scorer to rotate in a clockwise direction, as viewed in Figure 3.

The material will pass between the wheel and bottom wall 24 onto conveyor 17 which is operated at a speed slightly faster than the movement of the extruded material so as to separate the cut sheets 50 of plastic material along the upper run 16 of conveyor 17 after the cutting blades 49 have cut the sheets of plastic material by a shearing action along the forward edge of bottom wall or plate 24. Inasmuch as the cutting and scoring wheel is rotated by the flow of the extruded material, this material may be removed through the supply tube 20, and the nozzles 18 at any desired speed without affecting the character of the strip or sheet of material which is discharged or extruded from the nozzle. This machine will eliminate the intermediate step at present in effect of congealing the butter or oleomargarine prior to the shaping of the material for market purposes.

With a machine as hereinbefore described, the material may be taken immediately from the churn or the congealing machine and extruded through the nozzle 18.

The machine hereinbefore described is of simple construction and is also so constructed and arranged that it may be easily and quickly assembled or taken apart for cleaning purposes or the like, so that the device may be kept in a sanitary condition.

The use of a heat lamp 53 provides a means whereby the extruded material will not stick to the scoring and cutting blades.

What is claimed is:

In a machine for scoring and cutting congealed material, a nozzle of rectangular cross-section having top, bottom and side walls, said bottom wall terminating forwardly of said top wall, means connected to the nozzle to provide a pressurized source of material supply for material to be extruded through said nozzle, a receiving conveyor underlying the nozzle and projecting forwardly therefrom, means connected to said conveyor for driving said conveyor, and a scoring and cutting member mounted for rotation about a stationary axis concentric with an arc extending between the terminal edges of the bottom and top walls of the nozzle, means operatively associated with said nozzle for adjusting the terminal edge of the top wall of the nozzle relative to said cutting member to alter the thickness of the extruded material, a blade on said cutting and scoring member extending, at least, to the terminal edges of the bottom and top walls of the nozzle at the maximum adjusted distance of said top wall from said bottom wall, material discharged from said nozzle impinging against said blades to rotate the scoring and cutting member, said means for driving said conveyor, moving said conveyor at a speed in excess of the speed at which material is extruded from said nozzle.

References Cited in the file of this patent

UNITED STATES PATENTS

| Number | Name | Date |
|---|---|---|
| 519,209 | Van Eyck | May 1, 1894 |
| 1,065,186 | Stewart | June 17, 1913 |
| 1,065,284 | Volkmann | June 17, 1913 |
| 1,221,594 | Richman | Apr. 3, 1917 |
| 1,424,117 | Popper | July 25, 1922 |
| 1,481,127 | Doering | Jan. 15, 1924 |
| 1,492,388 | Popper | Apr. 29, 1924 |
| 1,558,206 | Simpson | Oct. 20, 1926 |
| 1,699,086 | Winkie | Jan. 15, 1929 |
| 1,848,274 | Sharp et al. | Mar. 8, 1932 |